Figure 1:
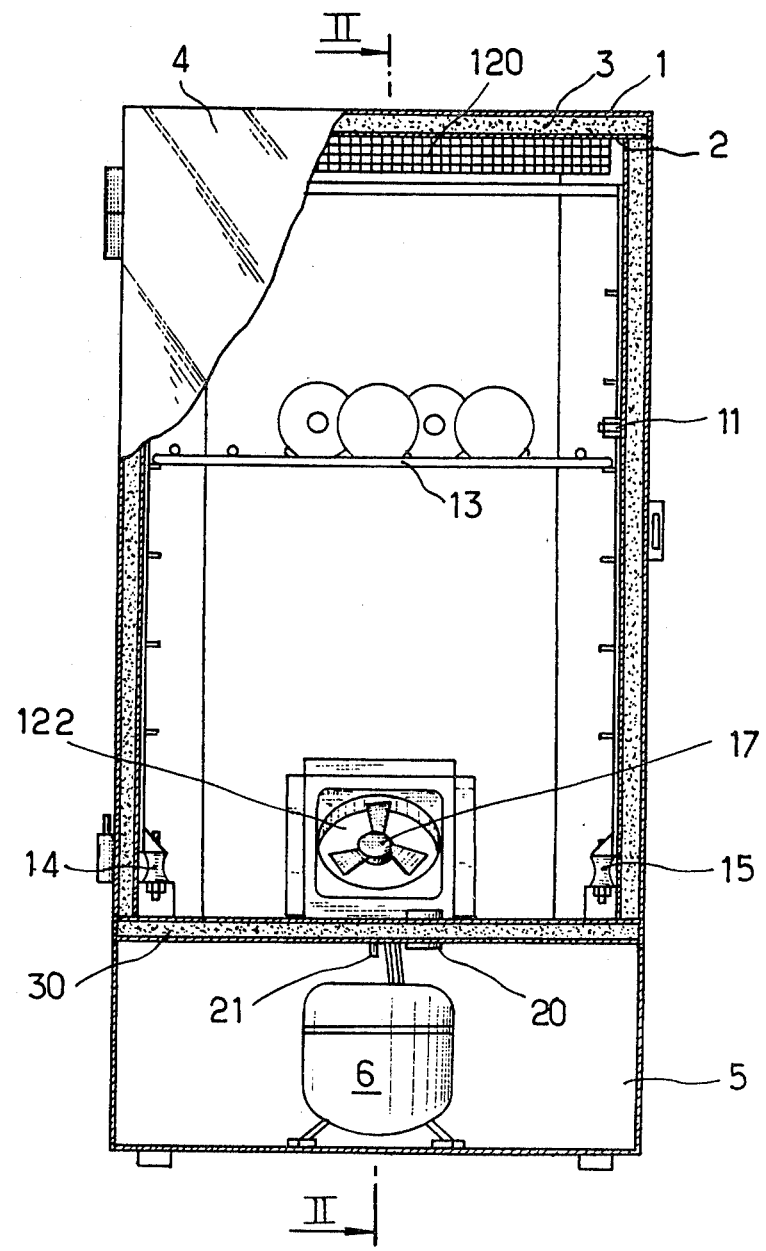

United States Patent [19]

Rousseau et al.

[11] 4,248,061

[45] Feb. 3, 1981

[54] THERMOSTATICALLY AND HYGROSTATICALLY CONTROLLED CABINET FOR STORING FOODSTUFFS AND OTHER PARTICULARLY DELICATE PRODUCTS

[75] Inventors: Alain Rousseau, Paris; Francois Ramel, Levallois, both of France

[73] Assignee: Effa Etudes, France

[21] Appl. No.: 41,129

[22] Filed: May 21, 1979

[51] Int. Cl.³ ............................................. F25D 17/06
[52] U.S. Cl. ..................................................... 62/419
[58] Field of Search ........................... 62/91, 418, 419

[56] References Cited

U.S. PATENT DOCUMENTS

| | | | |
|---|---|---|---|
| 2,209,431 | 7/1940 | Tull | 62/419 X |
| 2,492,308 | 12/1949 | Menges | 62/91 X |
| 2,591,862 | 4/1952 | Pedigo | 62/91 X |
| 3,667,249 | 6/1972 | Brown et al. | 62/91 X |

*Primary Examiner*—Lloyd L. King
*Attorney, Agent, or Firm*—William A. Drucker

[57] ABSTRACT

A thermostatically and hygrostatically controlled cabinet for storing foodstuffs has a food storage chamber partially surrounded by an elongated space communicating with the food storage chamber through a grid. A fan establishes forced air circulation inside the elongated space, through the grid and inside the food storage chamber. An evaporator and a provision of water are located inside the elongated space and a compressor and a condenser are positioned outside the elongated space and the storage chamber. Thermostatic control means start the compressor when the temperature inside the food storage chamber exceeds a rated value and, after a time delay, also start the fan.

7 Claims, 2 Drawing Figures

U.S. Patent  Feb. 3, 1981  4,248,061

THERMOSTATICALLY AND HYGROSTATICALLY CONTROLLED CABINET FOR STORING FOODSTUFFS AND OTHER PARTICULARLY DELICATE PRODUCTS

The present invention concerns a thermostatically and hygrostatically controlled cabinet for storing foodstuffs and other particularly delicate products.

Thermostatically-controlled cabinets for the storage of meat, pastry, wine, tobacco, cheese and laboratory products usually include cooling and, possibly, heating devices and, in some cases, notably for the storage of wine in bottles, means of humidifying the air, though without regulating the degree of humidity. In these known cabinets, there is usually a high thermal gradient, the temperature being e.g. 10° C. at the top and 15° C. at the bottom of the cabinet, which causes desiccation of the produce at the bottom of the cabinet, the warmer air at the bottom becoming laden with steam which condenses at the top on the cold parts. Moreover, the intake of outside air required to maintain the proportions of the different constituent gases in the chamber generally has the effect of modifying the degree of humidity.

One of the aims of the invention is to provide a simply-constructed thermostatically-controlled cabinet comprising efficient regulation of the degree of humidity in the air, comprising no hygrostat and compatible with renewal of the air by intake from outside.

The cabinet accordiang to the invention includes: a chamber having a thermally-insulating outer wall and an inner partition which, with said wall, defines an elongated space at least partly surrounding a usable inner space; means of storing products in said usable space; a window formed in a first portion of said partition; a plurality of apertures formed in a second portion of said partition, the second portion being at a distance from the first; a fan, cooperating with said window to establish forced air circulation inside said elongated space, through said apertures and inside said usable space, following a closed circuit going through said window; a refrigerating unit, including an evaporator situated inside said elongated space and operating at a pre-determined temperature exceeding 0° C., said refrigerating unit moreover including a compressor and a condenser positioned outside said chamber, means, cooperating with said refrigerating unit, of regulating, around a rated value exceeding said pre-determined temperature, the temperature inside said usable space; and a provision of water, positioned inside said elongated space, on a portion of said closed circuit situated downstream of said evaporator. This forced air circulation eliminates temperature gradients in the usable space and, in view of the fact that the evaporator's operating temperature is determined by adjustment of the expansion pressure of the refrigerating fluid, the result is, as will be explained farther on, regulation of the degree of humidity of the air in the usable space, which regulation makes it possible to maintain this degree at the required value, e.g. 65%.

Figure 2:
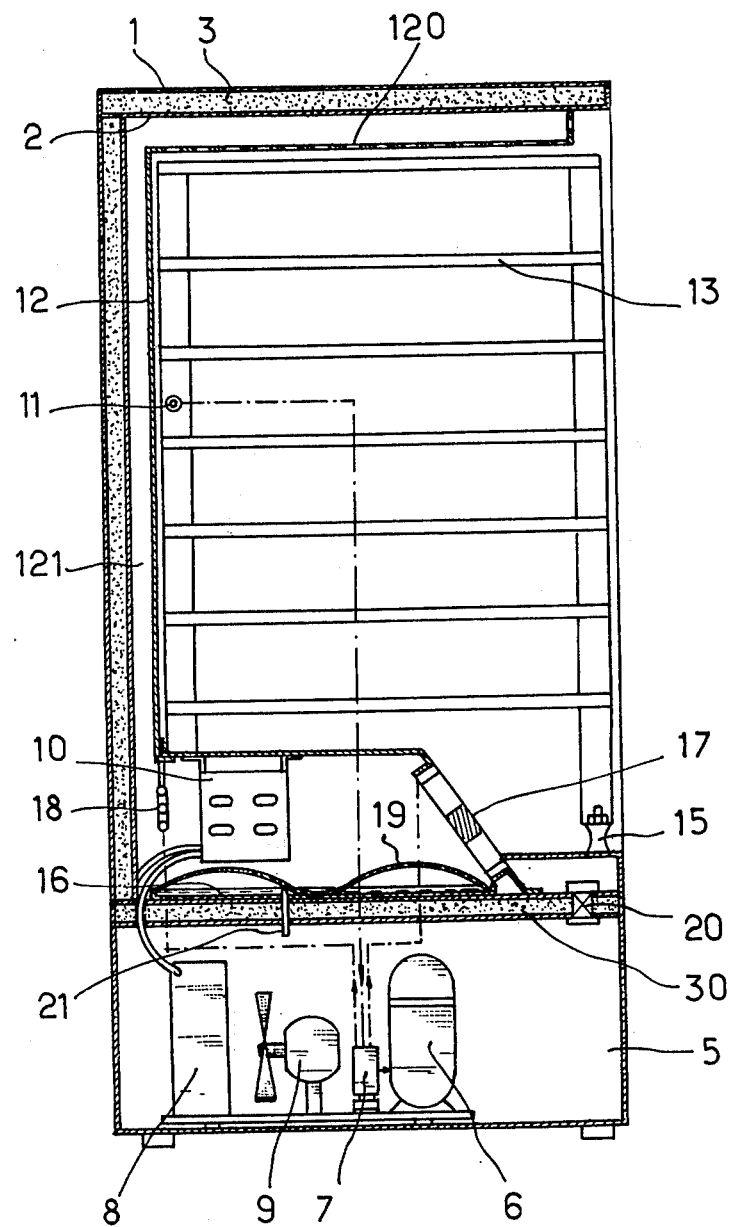

A better understanding of the invention will be obtained from the description given below as a non-limiting example and with reference to the attached drawing, in which:

FIG. 1 is a front elevation view, in partial section, of a cabinet according to the invention, the door of which is partly exploded, and FIG. 2 is a view of this cabinet according to the invention, in partial section along the line II—II in FIG. 1.

The cabinet shown in the drawing includes a heat-insulated chamber having a thermally insulating outer wall made up of two metal sheets 1 and 2 between which a plastic foam 3 is expanded. This chamber, closed by a front door 4 which is also thermally insulating, rests on an engineering compartment 5 which contains the main components of a standard refrigerating unit, with the exception of the evaporator, viz: a compressor 6, a regulator or thermostat 7 and a forced circulation condenser 8 whose fan has been shown at 9. As will be seen farther on, evaporator 10 is positioned inside the heat-insulated chamber and thermostat 7 cooperates with a thermal probe 11 also positioned in said chamber, and with the compressor, the connections having merely been represented by a line of dots and dashes.

It can be seen that a sheet metal partition 12 (FIG. 2) divides the chamber into two separate areas, viz: an elongated space roughly in the shape of a letter 'C', whose branches surround, on three sides, a usable storage space in which is placed a storage unit, such as a rack or basket, with an openwork framework which does not prevent air circulation. In the example described, this is a bottle rack consisting of a framework 13 with slides supporting rods. This framework rests on a partition portion 12 situated in the vicinity of the bottom 30 of the chamber via rubber pattens 14–15.

The top horizontal branch of the 'C', connected at its end above the chamber, forms an air distribution grid 120 (FIGS. 1 and 2), while the vertical branch, with the rear wall of the chamber, forms a relatively narrow chimney 121 and the bottom horizontal branch forms a compartment large enough to take the evaporator 10, a water container 16 standing on bottom 30, a fan 17 and, possibly, a heating resistor 19. Fan 17 is fixed to a portion of partition 12 equipped with a window 122 and at a distance from grid 120: in the form of embodiment described, this portion is inclined in relation to the horizontal plane and situated in the vicinity of the end of the bottom branch of the 'C'.

The working of the cabinet described will now be explained, considering first a form of embodiment designed to operate in a room where the air is warmer than the rated temperature of the usable space of the chamber, this being e.g. 11° C. The heating resistor 18 is then unnecessary.

As soon as the temperature inside the usable space exceeds 11° C. by more than 0.1° C., compressor 6 is switched on by thermostat 7. A timing circuit, which forms part of component 7, then starts fan 17 after a time, e.g. 90 seconds, long enough for evaporator 10 to have had time to reach its operating temperature.

The latter, determined by the unit's refrigerating fluid charge, can thus be fixed at a suitable value (as defined below), i.e. 7° C. in the example under consideration.

Fan 17 sets up a forced circulation of warm air in a closed circuit, which passes at least partially over the provision of water 16, through the evaporator fins, to circulate at relatively high speed (e.g. a few meters per second) in chimney 121 and penetrate, through grid 120 which slows it and distributes it evenly, into the usable space which it passes through slowly (e.g. at a speed of a few centimeters per second) and is finally sucked through window 122 by the fan.

This forced air circulation not only reduces the temperature gradient in the usable space (it has been found that the temperature at the bottom of the usable space did not exceed the temperature at the top of said space by more than 1° C.) but also regulates the degree of humidity, which will be maintained in said space at 65%, with a maximum difference of 3%, as will now be explained:

This regulation of the degree of humidity is linked to the fact that the air possibly draws humidity from contact with the provision of water and possibly loses its excess humidity on contact with the evaporator until saturation is obtained at the evaporator operating temperature. Now, this saturation (100%) at 7° C., is equivalent to a degree of humidity of 65% at the rated temperature of 11° C. In other words, to obtain the required degree of humidity in the usable space, it is finally sufficient suitably to adjust the unit's charge of refrigerating fluid (expansion pressure). Nevertheless, this assumes that ventilation is calculated in such a way that it absorbs only slightly less power than that available at the evaporator at the operating temperature.

Humidity is only regulated when the refrigerating unit is in operation. As soon as this is switched off, convection movements will have the effect of making air pass over the open surface of the provision of water, in the absence of ventilation. There will therefore be a rise in humidity. The very narrow thermostat differential means that the unit starts up fairly often and for a short time, in proportions which vary in terms of the outside temperature. However, humidification of the air can be limited by placing an absorbent porous product on the water container, such as felt (shown at 19), which will introduce a time constant into humidification of the air. This time constant will also appear when the unit and ventilation are in operation, without thereby interfering with operation since even if the air no longer becomes saturated when it passes over the felt, as it did when it passed over the open surface of the water, it will always absorb enough humidity to be saturated at the evaporator's operating temperature. In this way, the rise in humidity while the system is "off" will be less marked.

At 20, a filter cartridge placed in an aperture in the bottom 30 has been shown, and at 21, an overflow pipe going through said bottom and penetrating into container 16.

This filter cartridge positioned upstream of the fan, i.e. at slightly lower pressure than outside when the fan is operating, ensures the intake of a controlled quantity of outside air into the chamber. An equal quantity of air is expelled through overflow 21, which is at slightly higher pressure than the outside. There is therefore a small but constant renewal of the air in the chamber.

When the cabinet has to operate in an atmosphere which can reach temperatures below the rated value, the heating resistor 18 is switched on by component 7, at the same time as fan 17, as soon as the thermometer indicates a temperature lower by 0.1° C. than said rated value Tc.

The air in the usable space is then heated to a temperature comprised between Tc−f0.1° C. and Tc, at which a suitable circuit, which forms part of component 7, switches off the resistor and fan 17 and starts up the compressor. After the above-mentioned time (90 seconds in the example described), component 7 starts fan 17. Component 7 is set (timing circuit) so that the compressor operates for about one minute (with a fan air flow rate of 50 liters/second and a usable space of 250 liters; these values are obviously not limiting) and the fan is then switched off at the same time as the compressor. This operating time corresponds to a specific number of renewals of the air in the usable space (e.g. 12). It is fixed so as to allow the temperature in the usable space to come down to a value which remains very close to rated value Tc (to within less than 0.1° C.), at the same time keeping the degree of humidity to its fixed value (65%).

In the described form of embodiment shown, resistor 18 is positioned in the bottom compartment of the elongated space, near the mouth of the chimney, a place where it does not heat the water in the container.

Use of the felt 19 covering the open surface of the water is essential to avoid saturation of the air and, consequently, condensation on the bottles which will be the coldest point in the air circuit.

As a variant, for cabinets with a larger usable space, it would be advantageous to put two warm air circuits in parallel, each fitted with a fan and connected in parallel so that the warm air which they generate passes through the usable space. One of the two circuits will then comprise the evaporator of the refrigerating unit and provide heat and humidity regulation when the outside temperatures are higher than the rated value; the other circuit will comprise a heating resistor and will only provide heat regulation. This second circuit, not comprising the passage of air over the evaporator and the provision of water, will have no effect on the degree of humidity, which will remain practically constant while it is in operation.

In the drawing, the preferred arrangement of fan 17, water container 16 and evaporator 10 has been shown, and the preferred C-shape of the elongated space for fast circulation of the warm air.

It must nevertheless be clearly understood that this arrangement and these shapes may be modified without departing from the spirit of the invention. In particular, it is not necessary for all the warm air to pass over the surface of the provision of water, nor for the evaporator to be situated in the inner compartment of the elongated space.

We claim:

1. Storage cabinet including: a chamber having a thermally-insulating outer wall and an inner partition which, with said wall, defines an elongated space at least partly surrounding a usable inner space; means of storing products in said usable space; a window formed in a first portion of said partition; a plurality of apertures formed in a second portion of said partition, the second portion being at a distance from the first; a fan, cooperating with said window to establish forced air circulation inside said elongated space, through said apertures and inside said usable space, following a closed circuit going through said window; a refrigerating unit, including an evaporator situated inside said elongated space and operating at a pre-determined temperature exceeding 0° C., said refrigerating unit moreover including a compressor and a condenser positioned outside said chamber; thermal regulation means, cooperating with said refrigerating unit, and starting or cutting off the compressor for regulating, around a rated value exceeding said pre-determined temperature, the temperature inside said elongated space, on a portion of said closed circuit situated downstream of said evaporator, said regulation means including a timing component set to start said fan at the end of a pre-determined time after start-up of the compressor.

2. Storage cabinet according to claim 1 in which said outer wall is equipped with a door, a vertical portion opposite the door, a horizontal bottom and top, and said elongated space is in the shape of a letter "C" having a vertical branch arranged along said vertical portion, a top horizontal branch arranged along said horizontal top and equipped with a grid which closes said apertures and a bottom horizontal branch arranged along said bottom, said second portion being next to the end of said bottom horizontal branch while the evaporator is situated in the vicinity of the connection between said bottom horizontal bottom branch and the vertical branch and the provision of water is arranged on said bottom.

3. Storage cabinet according to claim 1 wherein a layer of absorbent material is arranged on the open surface of the provision of water.

4. Storage cabinet according to claim 1 wherein said means of storing products include an openwork supporting framework, flexible shock-absorbing pattens being interposed between the base of said framework and the wall of the chamber.

5. Storage cabinet according to claim 1 wherein said thermally-insulating outer wall is equipped with first and second apertures, the first aperture constituting an intake of air from outside and being equipped with a filter cartridge.

6. Storage cabinet according to claims 2 and 5 wherein said first and second apertures are formed in the bottom of the chamber, the second aperture being fitted with a pipe acting as an overflow for the provision of water.

7. Storage cabinet according to claim 1, wherein an electric heating component is positioned inside the chamber and said regulation means being set to switch on said electric heating component at the same time as said fan, as soon as the temperature inside the usable space falls to a pre-determined value, to switch off said electric heating component and the fan as soon as said temperature has risen to a value below the rated value and then successively switch on the compressor, then, after a pre-determined time, the fan, the compressor being switched on for a pre-determined time and then switched off at the same time as the fan.

* * * * *